D. H. Chamberlain.
Drill-Stock.
N° 10,499.   Patented Feb. 7, 1854.
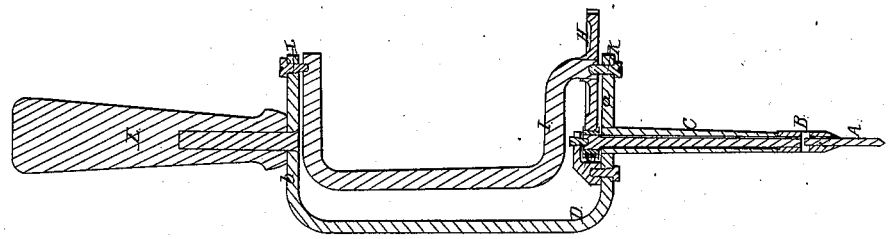
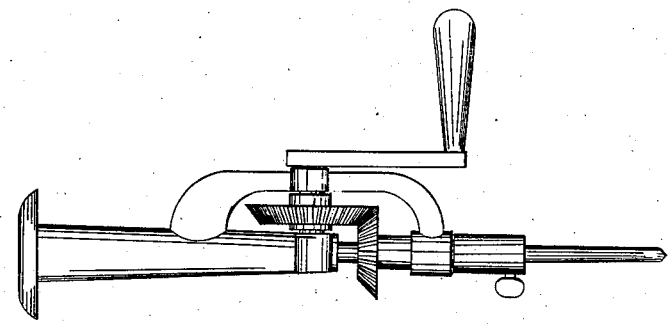
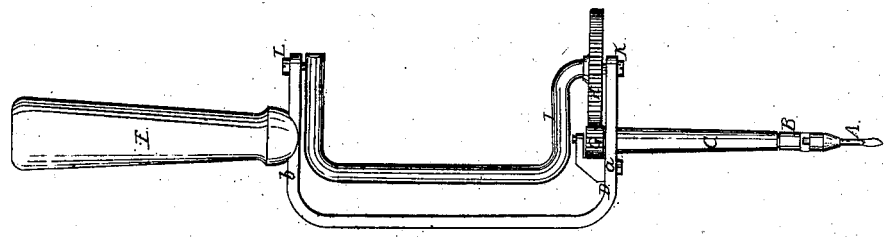

UNITED STATES PATENT OFFICE.

DEXTER H. CHAMBERLAIN, OF BOSTON, MASSACHUSETTS.

BIT OR DRILL STOCK.

Specification of Letters Patent No. 10,499, dated February 7, 1854.

*To all whom it may concern:*

Be it known that I, DEXTER H. CHAMBERLAIN, of Boston, in the county of Suffolk and State of Massachusetts, have invented a new and useful Improvement in Bit or Drill Stocks; and I do hereby declare that the same is fully described and represented in the following specification and the accompanying drawings, letters, figures, and references thereof.

Of the said drawings, Figure 1, represents a side elevation and Fig. 2, a longitudinal section of my improved drill stock.

In these drawings, A, represents the drill which is inserted in one end of a shaft or spindle B, that revolves within a tubular projection C, extended from the bent part, D, of the drill stock; the said bent part of the drill stock is formed of a piece of metal bent twice at a right angle as seen at $a$, $b$; the part $b$, being united to a handle, E, the axis of which is in a line with the axis of the drill shaft or spindle.

On the inner end of the drill shaft or spindle there is a pinion gear, G, which is made to engage with a larger gear, H, fixed upon the shaft of a bell crank, I, that is supported by and revolves in bearing centers or screws K, L, arranged as seen in the drawings, such screws being made to extend respectively through the parts, $a$, $b$, of the drill stock. The bell crank is thus arranged, so that it may rotate within the tool shaft stock and it is made entirely separate from such stock. By laying hold of the handle of the stock with the left hand and seizing and turning the bell crank by the right hand a person may produce a revolving motion of the drill or drill shaft, which will be accelerated in proportion to the rotary movement of the bell crank as the number of teeth in the large gear wheel is to the number of teeth in the pinion.

By my improved mode of constructing the drill stock in the manner above described the power applied to rotate the drill operates in a plane perpendicular to the axis of the drill, it being well known that this is the most advantageous method of applying the power in order to enable the drill to be worked to great advantage.

I am aware that a hand drill has been constructed so as to have its drill shaft supported in a stock and rotated by means of two beveled gears, one of them being fastened on the top of the drill while the other was affixed on a separate shaft disposed at right angles with the drill shaft, and having the crank applied so as to enable a person to rotate it and thereby put the drill shaft in rotation; a drill stock of such description being exhibited in side view in Fig. 3. I therefore lay no claim to such a device. In the said drill stock as exhibited in Fig. 3, the crank of it is made to rotate in a plane parallel to the axis of the drill shaft. The consequences is that during a rotation of the crank, there is an uneven pressure exerted on the drill, the said pressure being increased at one moment and diminished at another, and in the direction of the axis of the drill. A steady pressure on the drill longitudinally as well as laterally is very desirable particularly when a small drill is used as without it the drill is not only liable to be broken or injured but to be made to deviate from its desired course in passing through anything. The complication of the construction of the beveled gear bit stock and the disadvantages incident to it while in use render it an instrument of little value and utility. Neither do I claim making the tool stock and the bell crank in one piece of metal so that their rotations may be equal and simultaneous, but What I do claim is—

The arrangement of the bell crank separate from and so as to play or rotate within the tool shaft stock substantially as specified and as exhibited in Figs. 1, and 2 of the drawings; the said bell crank having a spur gear to work into a pinion fixed into the end of the tool shaft, and to impart to said tool shaft an accelerated motion essentially as specified.

In testimony whereof, I have hereunto set my signature this sixth day of January A. D. 1854.

D. H. CHAMBERLAIN.

Witnesses:
 R. H. EARLY,
 F. P. HALE, Jr.